Aug. 9, 1927.

E. DONAGHY 1,638,622

VEHICLE WHEEL

Filed Nov. 10, 1925

WITNESSES.
Agnes Morrison Watt
G. Marshall Mackulmie

Edward Donaghy INVENTOR
per

Patented Aug. 9, 1927.

1,638,622

UNITED STATES PATENT OFFICE.

EDWARD DONAGHY OF LISBURN, IRELAND.

VEHICLE WHEEL.

Application filed November 10, 1925, Serial No. 68,223, and in Great Britain June 4, 1925.

This invention relates to vehicle wheels, its object being to provide improvements therein.

According to this invention a vehicle wheel, whether provided with pneumatic, or solid tyres, has a ring of rubber, or equivalent resilient material inserted between the rim of the wheel and the hub and preferably placed immediately within the tyre carrying rim of the wheel to which it is secured and also to the felloe or rim proper of the wheel by retaining rings, or equivalent, suitably secured to the said resilient ring and to the outer tyre rim and the felloe or rim proper of the wheel by bolts, or equivalent fastenings. The bolts securing the rubber, or equivalent ring in position between the outer rim and the felloe of the wheel would preferably pass through serrated sleeves, or other tubes, which may if desired be vulcanized to the rubber. The rubber, or equivalent ring may be made with one, or more holes therethrough to increase the cushioning effect of the ring.

The invention will now be described with reference to the accompanying drawings whereon:—

Referring to the drawings:—

Figure 1:
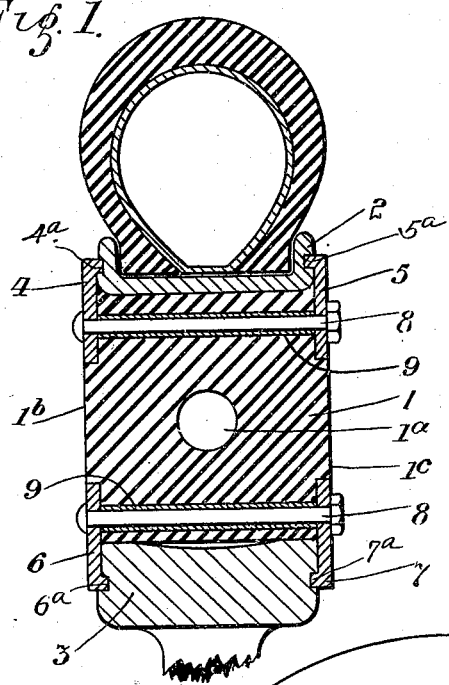
Fig. 1 is a cross sectional elevation of a portion of a motor car wheel having the cushioning ring inserted between the outer tyre rim and the felloe of the wheel, the section being taken on the line 1—1 of Fig. 3.

The cushioning ring 1 is, in the example shown made with a central hole 1ª therethrough and it is secured in position relatively to the tyre rim 2 and the felloe 3 of the wheel as shown at Fig. 1 by means of removable retaining rings 4, 5, 6 and 7, the said rings being held in position by means of bolts 8 which pass through holes in the ring 1, the bolts 8 being, in the example shown, passed through sleeves, or tubes 9, preferably serrated on their outer sides so as to grip the rubber, of the ring 1 to which, if desired, they may be vulcanized. The ring 1 is made as shown so that its sides 1ᵇ and 1ᶜ are flush with the outer sides of the rings 4, 5, 6 and 7, and the rings 4 and 5 are made with inwardly projecting flanges 4ª and 5ª adapted to engage corresponding grooves in the tyre rim 2 whilst the rings 6 and 7 are also made with inwardly projecting flanges 6ª and 7ª adapted to engage corresponding grooves in the felloe 3 of the wheel.

Figure 2:
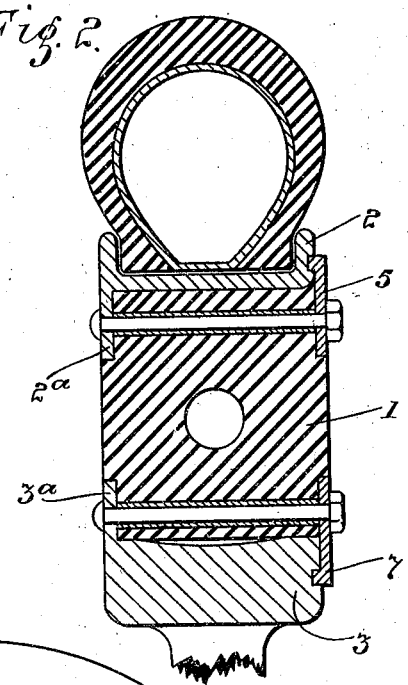
Fig. 2 is a similar view showing a modification in which the separate retaining rings at one side of the wheel are replaced by flanges.

In the example shown at Fig. 2 the rings 4 and 6 at the inner side of the wheel are shown replaced by flanges 2ª and 3ª projecting from the tyre rim and felloe respectively but I still employ the retaining rings at the outer side of the wheel to permit of removal of the rim 2 and the cushioning ring 1 when required.

Figure 3:
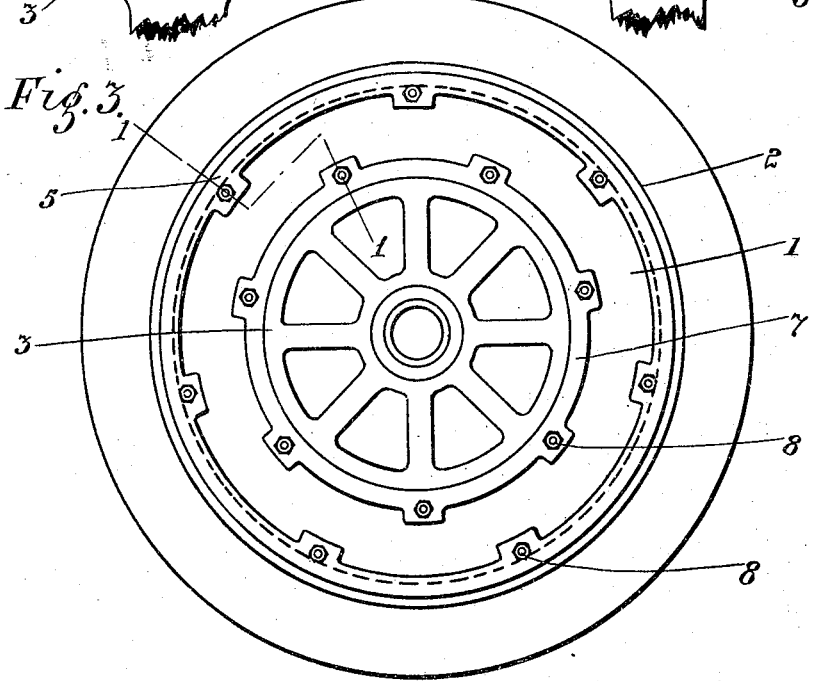
Fig. 3 is an elevation showing the side of the complete wheel to a smaller scale.

The complete wheel with the cushioning ring in position is shown in side elevation at Fig. 3 and it will be seen that the securing bolts and lugs of the outer and inner retaining rings are staggered to give the best possible retaining and securing action on the ring 1 and to assist in giving the greatest possible rigidity between the wheel rim 3 and the tyre carrying rim 2 whilst giving the desired cushioning effect by the introduction of the rubber, or equivalent resilient ring 1 as hereinbefore described. The felloe 3 is shown at Figs. 1 and 2 with its outer surface slightly transversely concave or dished, to permit of the ring 1 yielding under pressure.

Having now fully described my invention, what I claim and desire to secure by Letters Patent is:—

A wheel for vehicles comprising, in combination, a felloe having a transversely concave peripheral surface and an annular groove in each of its sides, a tyre carrying rim having an annular groove in each of its sides, a resilient annular member interposed between said felloe and said tyre carrying rim, flanged rings engaging with the grooves in the felloe, flanged rings engaging with the grooves in the tyre carrying rim, bolts passing through said rings and said resilient member, and sleeves passing through said resilient member and surrounding the bolts, to secure said resilient member on said felloe and said tyre carrying rim on said resilient member.

In testimony whereof I affix my signature.

EDWARD DONAGHY.